US 6,650,890 B1

(12) United States Patent
Irlam et al.

(10) Patent No.: US 6,650,890 B1
(45) Date of Patent: Nov. 18, 2003

(54) VALUE-ADDED ELECTRONIC MESSAGING SERVICES AND TRANSPARENT IMPLEMENTATION THEREOF USING INTERMEDIATE SERVER

(75) Inventors: Gordon Raymond Irlam, Redwood City, CA (US); Brian Maggi, Cupertino, CA (US); Scott Petry, San Francisco, CA (US)

(73) Assignee: Postini, Inc., Redwood City, CA (US)

( * ) Notice: Subject to any disclaimer, the term of this patent is extended or adjusted under 35 U.S.C. 154(b) by 177 days.

(21) Appl. No.: 09/675,609

(22) Filed: Sep. 29, 2000

(51) Int. Cl.[7] ............................................. H04M 11/10
(52) U.S. Cl. ................. 455/412.1; 455/413; 455/414.1; 709/201
(58) Field of Search ..................... 455/3.01, 412.1, 455/414.1, 461, 466, 503, 413; 370/270, 912–913; 709/201, 202, 203, 206–207, 319, 229

(56) References Cited

U.S. PATENT DOCUMENTS

| 5,742,668 | A | * | 4/1998 | Pepe et al. .................. 709/201 |
| 5,844,969 | A | * | 12/1998 | Goldman et al. ........... 455/412 |
| 5,905,777 | A | * | 5/1999 | Foladare et al. ............ 455/414 |
| 6,014,429 | A | * | 1/2000 | LaPorta et al. ............. 455/412 |
| 6,061,718 | A | * | 5/2000 | Nelson ....................... 709/206 |
| 6,075,863 | A | * | 6/2000 | Krishnan et al. ........... 709/202 |
| 6,178,331 | B1 | * | 1/2001 | Homes et al. .............. 455/466 |
| 6,263,202 | B1 | * | 7/2001 | Kato et al. .................. 455/418 |
| 6,321,267 | B1 | * | 11/2001 | Donaldson .................. 709/229 |
| 6,335,966 | B1 | * | 1/2002 | Toyoda .................. 379/100.06 |
| 6,389,276 | B1 | * | 5/2002 | Brilla et al. ................ 455/413 |
| 6,411,684 | B1 | * | 6/2002 | Cohn et al. ............... 379/88.13 |
| 6,434,601 | B1 | * | 8/2002 | Rollins ....................... 709/206 |
| 6,438,215 | B1 | * | 8/2002 | Skladman et al. ..... 379/201.02 |
| 6,442,589 | B1 | * | 8/2002 | Takahashi et al. .......... 709/203 |
| 6,513,045 | B1 | * | 1/2003 | Casey et al. ............. 707/104.1 |

* cited by examiner

Primary Examiner—Nguyen T. Vo
Assistant Examiner—Simon Nguyen
(74) Attorney, Agent, or Firm—Baker & McKenzie

(57) ABSTRACT

The present invention provides for a centralized, preprocessing electronic messaging solution that performs value-added tasks to electronic messages on behalf of the ISP or the end user, before these messages are delivered to the destination email server. The service can detect and detain damaging or unwanted messages, such as spam, viruses or other junk email messages, and route electronic messages from various sources covering a variety of topics to wired and wireless destinations, apart from the intended recipient email address, in various formats.

36 Claims, 8 Drawing Sheets

VALUE-ADDED ELECTRONIC MESSAGING SERVICES AND TRANSPARENT IMPLEMENTATION THEREOF USING INTERMEDIATE SERVER

BACKGROUND OF THE INVENTION

1. Field of the Invention

The present invention relates to electronic messaging such as email.

2. State of the Art

The adoption of email has occurred at an unprecedented pace. Of routine computer users, most now have or soon will have an email address. Many have more than one email address, e.g., one for work and another for home. Email offers unparalleled convenience of written communication.

Besides ubiquitous email, another powerful trend is wireless access via a variety of wireless devices, e.g., cell phones, pagers, hand-held computers such as Palm and Windows CE devices, etc. Service-specific email gateways allow an email message to be sent from the Internet to a particular wireless device. In the case of a Sprint PCS phone, for example, an email may be addressed to #@sprintpcs.com, where # represents the telephone number of the phone. Despite this capability, wireless messaging is greatly complicated by the fact that a person may have multiple wireless devices, and that at a given time, the sender has no way of knowing the person's whereabouts or preferred method of message delivery at that time, let alone the address specifics pertaining to each gateway.

For example, the person may be in the office, in which case desktop email would be preferred, on the road staying at a hotel, in which case cell phone email might be preferred, or on the road away from a major metropolitan area, in which case pager email (which has nationwide coverage in the US) might be preferred. This situation, referred to herein as the "multiple email box conundrum," is illustrated in FIG. 1. An intended recipient B of an electronic message may receive electronic messages through one or more wired devices and/or one or more wireless devices, which may include some or all of the following: an ISP mail account, a free web mail account, a PDA mail account, a cell phone subscription, and a pager subscription. In each instance, email is delivered through a different server or gateway connected to the Internet, i.e., a ISP mail server, a portal mail server, a PDA mail server, a cellular gateway and a paging gateway. A message originator A may, at various times, use some or all the devices mentioned to send an electronic message. In the multiple email box conundrum, the message originator needs to know which email address to use to reach the user. In turn, the recipient must monitor all accounts and devices to keep track of critical information.

Furthermore, in the case of a wireless network gateway, the wireless gateway will typically strip off any email attachments, usually without any notification to the user.

Note that, in FIG. 1, wired devices may be stand-alone or LAN-based. In the case of stand-alone devices, connection to the Internet is typically dial-up access through an ISP. In the case of a LAN-based device, a server on the LAN may be connected to the Internet through an ISP or directly to the Internet without the involvement of an ISP.

Neither ISPs nor wireless providers are well-positioned to offer a complete solution to the electronic messaging problem. ISPs are primarily focused on new customer acquisition and often do not have enough users to attract wireless partners. In the case of wireless providers, users are generally unwilling to switch their primary email address. And wireless vendors are generally unable to integrate with existing email services.

With the widespread adoption of email, there has also occurred the proliferation of junk email, or "spam." Currently, of the hundreds of millions of email messages sent each day, about 30% of those messages may be expected to be junk email. FIG. 2 illustrates "spamming" of the user of FIG. 1. Various companies (e.g., Brightmail Inc. of San Francisco, Calif.) have addressed the problem of junk email by providing email filtering software that attempts to identify and discard junk email. Typically, such software resides on a destination email server. Such a solution does not scale well; i.e., installing and maintaining email filtering software on email servers grows increasingly difficult as the number of email servers multiplies.

Because of the resources required to install and maintain an email server, various companies have emerged offering email outsourcing in which the email server is provided by a third party outside the organization. Email outsourcing off-loads the responsibility for providing and maintaining email service without necessitating any change in domain or email addresses. Email is retrieved from an off-site email server provided and maintained by the email outsourcing company. One example of an email outsourcing company is United Messaging Inc. of Malvern, Pa. Despite such arrangements, the multiple email box conundrum and the junk email problems remain.

Accordingly, a need exists for a scalable, transparent solution to the junk email problem. Also, a need exists for a unified messaging solution, embracing wireless messaging, that addresses the foregoing drawbacks of the prior art.

SUMMARY OF THE INVENTION

The present invention, generally speaking, provides for a unified electronic messaging solution in which individual, configurable user profiles are used to route and deliver electronic messages from various sources, wired and/or wireless, to various destinations, wired and/or wireless, in various formats. For example, the subject line of an electronic message may be sent to a user's pager, while an abbreviated version of the message is sent to the user's PDA having wireless-connectivity and the full electronic message is sent to the user's work. The unified electronic messaging solution may be deployed by ISPs within the existing Internet infrastructure. More preferably, scalability is greatly enhanced by providing (e.g., as part of a Network Operations Center, or NOC), an intermediate server that precedes a destination server on an electronic message delivery path. The electronic messaging solution allows provides for performance of a variety of value-added services, such as junk email filtering, recipient-directed message routing, including wireless delivery to any of a variety of wireless devices, rich media services such as attachment preview, etc. In the latter embodiment, the operator of the intermediate server therefore functions as an Electronic Messaging Service Provider (EMSP). Preferably, the intermediate server is inserted into the electronic message delivery path by changing a DNS (Domain Name Server) entry pertaining to the destination email server. As a result, no new hardware or software is required for users or ISPs. Because a single NOC including the intermediate server can serve far-flung geographic regions, scalability is achieved. The ease of inserting the intermediate server into the electronic message delivery path enables self enrollment by ISPs (Internet Service Providers)

in a cooperative services program (that may involve revenue sharing), enabling effective penetration to second-tier ISPs, which are extremely numerous. In one embodiment, junk email, instead of being deleted without notification, is posted to a user-accessible web site where it is kept for a period of time. A user therefore has an opportunity to verify that the diverted messages are indeed junk email. Through the web site, a user may create a profile governing the forwarding of messages. Preferably, the web site is accessible both from the desktop and from the wireless devices themselves, enabling real-time update of the profile by the user or by agent software.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

Figure 3:
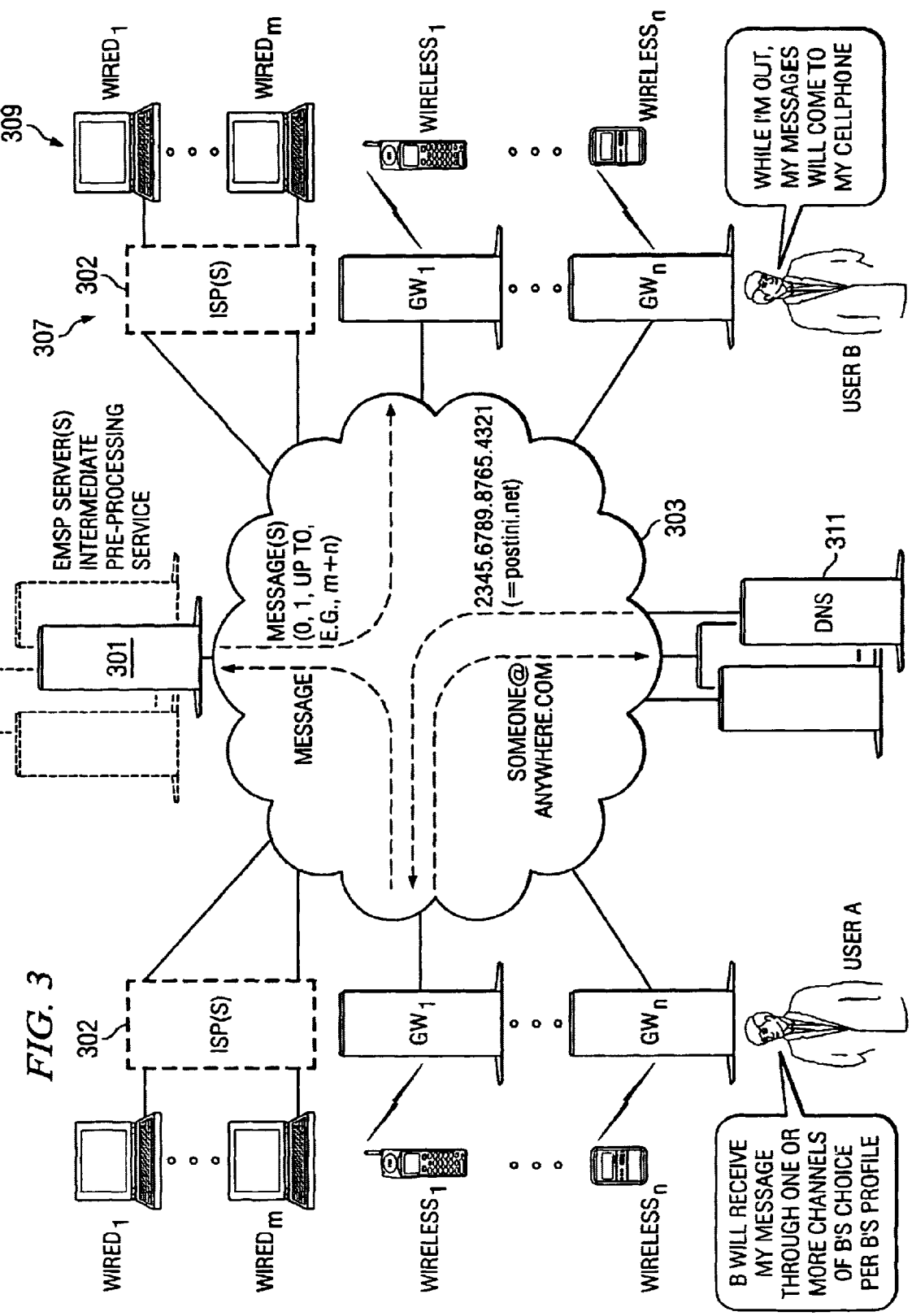
FIG. 3 is a diagram of one embodiment of a unified message delivery system.

Referring now to FIG. 3, a diagram is shown of one embodiment of a unified message delivery system. The system provides for a service that allows the user to define where messages are routed across multiple devices, which portions of messages are routed to which devices, etc. The system allows for ready integration with an end-user's primary email service and is end-user configurable.

Figure 1:
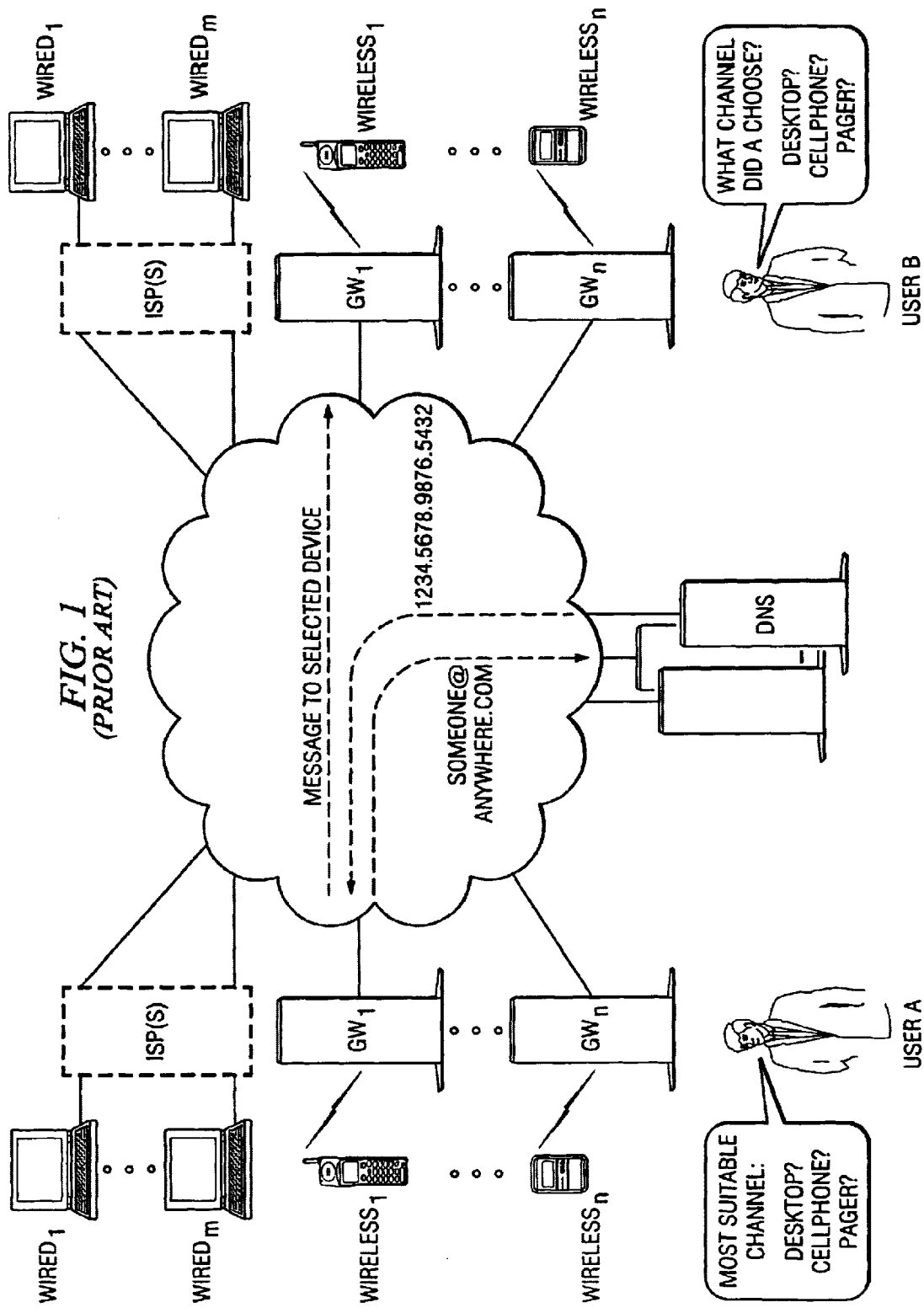
FIG. 1 is a diagram illustrating the multiple email box conundrum.
Figure 2:
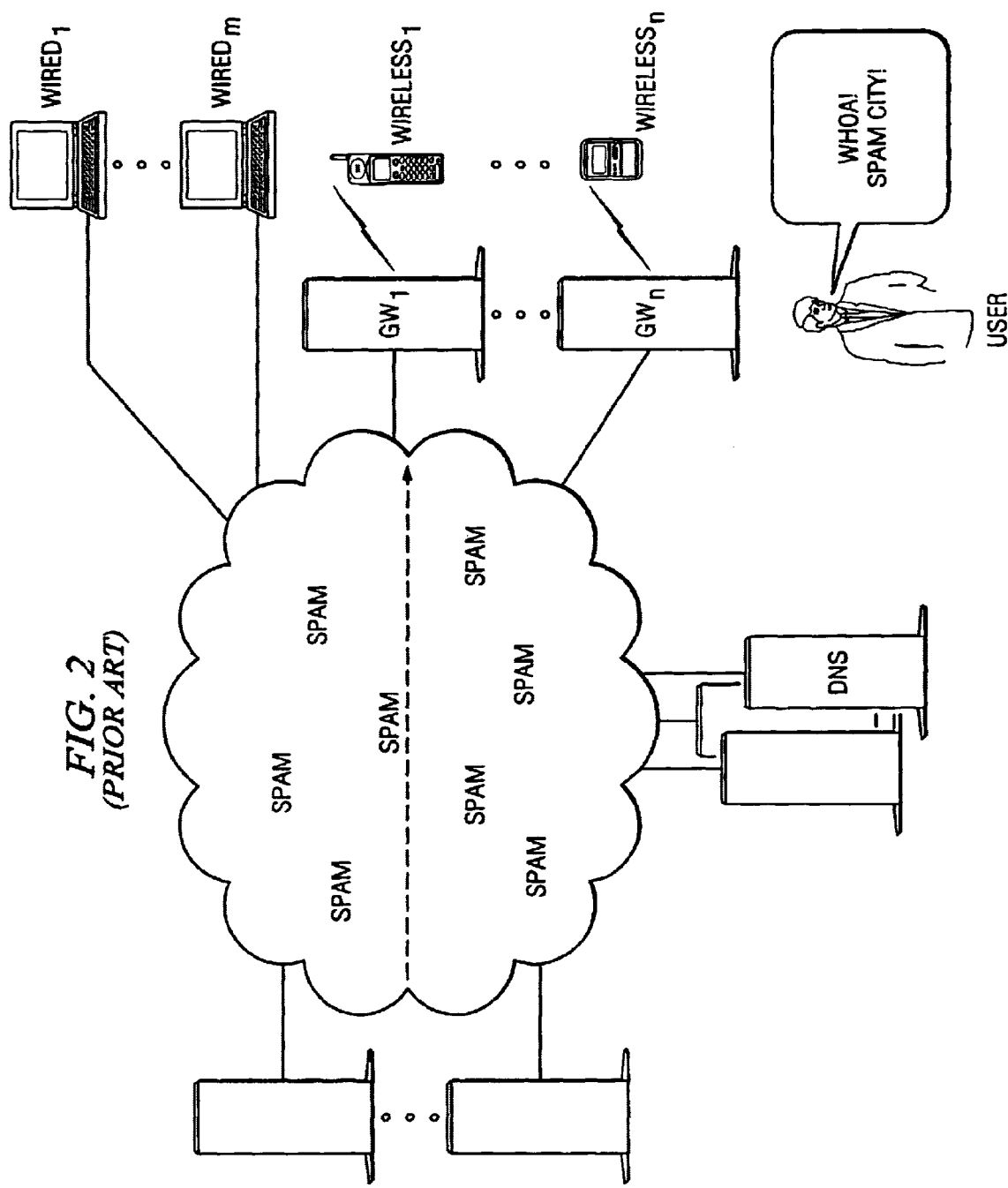
FIG. 2 is a diagram illustrating "spamming" of the user of FIG. 1.

As compared to FIG. 1, in which the electronic message delivery path proceeds through the Internet directly to one of a multiplicity of servers or gateways, in the system of FIG. 3, an intermediate pre-processing service 301 is inserted into the message delivery path. The intermediate pre-processing service 301 preferably comprises an NOC including an array of mail handling machines, a database, a file store, web servers and utility machines. The intermediate pre-processing service 301 is in turn connected to the various servers and gateways of FIG. 1, including, for example, a user's primary ISP 303, if any. Such connection typically also occurs through the Internet (305). The collection of servers and gateways 307 provide email access for a variety of wired and wireless client devices 309, which may include, for example, a main email system (typically a home or office desktop computer), a free web-based mail system (e.g., Yahoo or the like), a PDA (e.g., Palm VII), a cell phone and a pager. A typical user will use two or more of the foregoing electronic message delivery options and some users will use most or all of these options.

By established user-defined preferences, the user is able to control the flow of messages to the various devices. Preferences are configured using web browser software to create or modify a user profile. User profiles are stored in a relational database (not shown) accessible to the intermediate pre-processing service. Note that end-user configuration may occur via any web-enabled device, either wired or wireless. Wireless web access may be supported using technologies presently-known in the art such as Palm's "web clipping" technologies, the UPLink server suite of Phone.com of Redwood City, Calif., Wireless Application Protocol (WAP)-enabled cellphones, etc.

To take a concrete example, there may be three email messages delivered to the intermediate pre-processing service 301 for a particular user, an urgent message, a message from the user's boss, and a message from the user's friend. In this example, the email from the user's friend might be delivered to the user's main email system and to the user's free web mail system The email from the user's boss might be delivered to the user's PDA. The urgent message might be delivered to the user's cell phone and to the user's pager.

FIG. 3 illustrates the different manner of operation of the message delivery system of FIG. 3, including the intermediate pre-processing service 301, as compared to the conventional electronic message delivery path of FIG. 1. Say, for example, that user A, (e.g., Sue@standford.edu) wishes to send a email to user B (e.g., Tom@aol.com). Sue uses an email program to create, address and send the email. The mail is sent from Sue's computer to the local mail server for Sue's computer, which may reside on Sue's local area network or at an ISP. The local mail server queries a Domain Name Server (DNS) 311 to obtain the IP address for Tom@aol.com. Normally, the local mail server uses the IP address returned by DNS to send the email to the destination email server for Tom's computer, (e.g., mail.aol.com). The email is then delivered to Tom's computer.

In one embodiment of the present system, the normal electronic message delivery path is broken and the intermediate pre-processing service 301 is inserted into the electronic message delivery path. This result is easily accomplished by modifying the appropriate DNS record (such as the MX—mail exchange—record, for example) to point to the intermediate pre-processing service 301 instead of the destination email server (e.g., 303). In this manner, the electronic message delivery path is modified such that the intermediate pre-processing service 301 handles all of the electronic messages that would otherwise have been handled by the destination email server.

Given the ease with which the intermediate pre-processing service may be inserted into the message delivery path, the enrollment of Internet Service Providers (ISPs) in cooperative messaging service agreements with the operator of the intermediate pre-processing service (Electronic Messaging Service Provider, or EMSP) may be automated to a great extent. For example, the ISP may visit the web site of EMSP, indicate assent to terms and conditions, and specify billing information and a service start date.

Prior to the service start date, the ISP advises subscribers and arranges for its DNS entries to be modified appropriately as of the service start date.

Prior to the start date, users are advised by email of additional available message center services. Each user is assigned a user name and password in order to access a message center web site. When the user first visits the message center web site, the user creates a profile that will be used thereafter to select and configure value-added service (e.g., junk email filtering and virus checking) and to control message delivery. Within the profile, the user may designated a particular email server as the user's main email system. Profiles place users in control of their mail experience. Alternatively, A service provider can create a default profile of services and the user can visit the message center web site to modify the default configuration.

When the intermediate pre-processing service 301 receives an email, it look ups the addressee's user profile. The intermediate pre-processing service then performs value-added processing of the message. For example, the intermediate pre-processing service may apply user-selected junk email filters and user-selected virus checkers for checking attachments. Junk-email blocking may be based on both content and IP routing information. "Clean" email is delivered to the user's mail server as normal. Suspect messages, instead of being deleted without notification to the user, is held in a quarantine area, and the user is notified. The user can then, if desired, download messages flagged as suspect by accessing the message center web site.

Alternatively or in addition, the intermediate pre-processing service may deliver to the message to one or more wireless devices in accordance with the user profile, e.g., by forwarding the message to one or more servers or gateways 307 the addresses of which have been specified by the user in the user's profile. Prior to forwarding the message to a server or gateway, the intermediate pre-processing service 301 may perform any necessary reformatting to meet the requirements of a particular recipient device.

In general, a user may configure an arbitrary number of communication "channels," each channel including a destination and, optionally, one or more message modification procedures including filters, reformatters, etc. that may affect message presentation, be required for message transport, etc.

The intermediate pre-processing service 301 may perform myriad other types of services. One example of such services involves certain attachments, e.g., rich media items such as MP3, JPEG, MPEG, etc. Such items are notorious "bandwidth hogs" and can easily clog up the message delivery system. Rather than simply delete such items, however, the intermediate pre-processing service 301 allows such items to be intelligently managed. One option is to treat rich media in like manner as junk email. That is, rich media items, instead of being delivered with the email messages to which they are attached, are delivered to the message center web site, and the user is notified. The user can then view/play or ignore the items as desired.

Another option is to produce replacement attachments, i.e., "thumbnail" versions of the rich media items. An option may be provided for the original full attachment(s) to be delivered to the user with a subsequent system-generated email message. For example, a link may be embedded in the thumbnail along with appropriate text advising the user to click on the link to receive the full attachment. In one embodiment, clicking on the link takes the user to a complete, high resolution image residing in the user's personal message center.

Note that the functionality of the intermediate pre-processing service may be implemented at ISPs rather than at a central NOC without any sacrifice of functionality or any noticeable effect on the end user. In this instance, DNS information remains unchanged. In this scenario, however, ISPs must be persuaded to invest in additional hardware and/or software.

Figure 4:
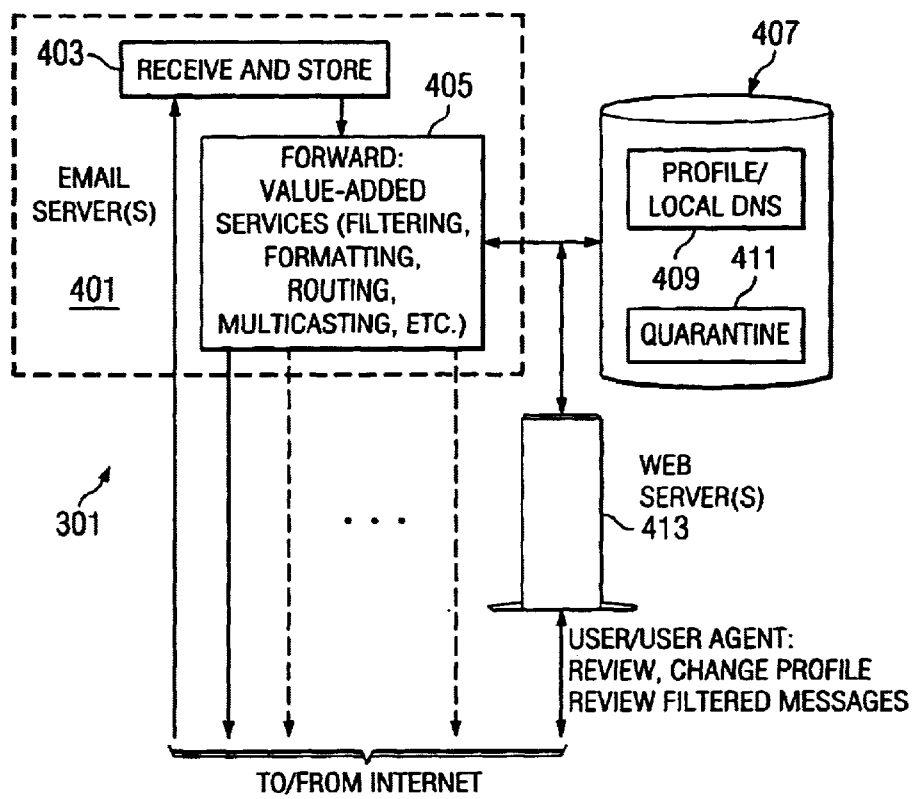
FIG. 4 is a block diagram of one embodiment of the intermediate server(s) of FIG. 3.

Referring to FIG. 4, a generalized block diagram is shown of one embodiment of the intermediate pre-processing service 301 of FIG. 3. One or more messaging servers 401, e.g., email servers, are provided, realizing a receive and store function 403 and a forward function 405. The forward function incorporates various value-added services such as filtering, formatting, routing, multicasting, etc. Due to the multicasting feature of the forward block 405, a single incoming message may result in the forwarding of some greater number of outgoing messages.

The forward block 405 communicates with storage 407, which may include one or more relational databases or file servers. Storage 407 includes profile and local DNS information 409 for each subscriber, as well as a "quarantine" area 411 for storing filtered messages, e.g., messages determined to be unfit to forward. Subscribers are provided access to storage 407 through one or more web servers 413, allowing subscribers to configure their profiles, view filtered messages, etc.

Figure 5A:
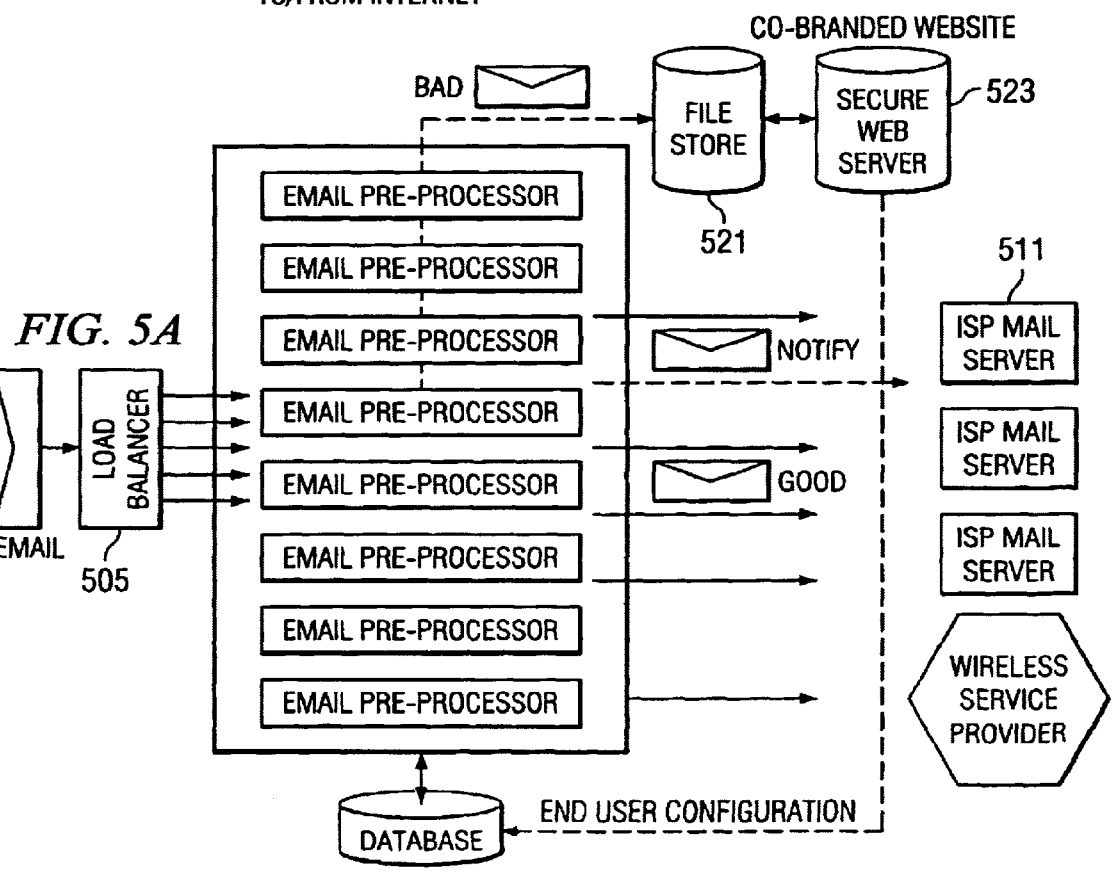
FIG. 5A is a more detailed block diagram of one embodiment of the server of FIG. 4.

Referring to FIG. 5A, a more detailed block diagram is shown of the intermediate pre-processing service 301 in accordance with an exemplary embodiment of the invention. Multiple hosts are defined on both the inbound mail server and the outbound mail server. Each host runs a copy of an appropriate mail program such as FreeBSD Qmail. In one alternate embodiment, a machine or a cluster of machines operates as a mail-receiving machine and a mail-delivering machine. This machine will accept a connection from a sending SMTP server and begin receiving data. Simultaneously, the machine will begin receiving the message data, querying the database for a specific user configuration, processing messages based on configuration, opening a connection to a receiving SMTP server, and delivering it. Standard mail server software is not required for this alternate embodiment.

Incoming mail is routed to an available host by a load balancer 505, or load-sharing switch/router, of a type commonly available from Cisco and other network equipment manufacturers. The server cluster 501 can include a server running a relational database management system such as Oracle, for example. The host queries the database to identify the user and user preferences. The host then processes the message as specified in the user profile. For spam checking, each host runs a copy of an appropriate spam filter. Virus checking can be done using a virus scanning application such as that available from Trend.

Good emails are addressed with one or more addresses in accordance with information specified in the user profile and sent to the outbound mail server cluster to be sent out. To deliver a message addressed to user@isp.com, our intermediate preprocessing lookup service looks up user@postini-mail.isp.com and delivers This allows the ISP to update the final delivery location without requiring the intermediate preprocessing service to make any changes. The email is sent to the ISP mail server 511 and possibly to other servers or gateways in accordance with the user profile.

Bad emails are saved "in quarantine" on a message center web site, and a notification email is sent to the user. In the illustrated embodiment, the inbound mail server cluster is connected to a file store 521. The file store is in turn connected to a web server 523. When a user logs on to the web server, a web page is displayed that includes a link for displaying a summary of quarantined messages and/or attachments. By clicking on a selected item, the user is able to view the item and, depending on the attachment type, may be able to view the attachment. If the user so chooses, the user may be allowed to download an item suspected to contain a virus after the user has been given appropriate warning.

Figure 5B:
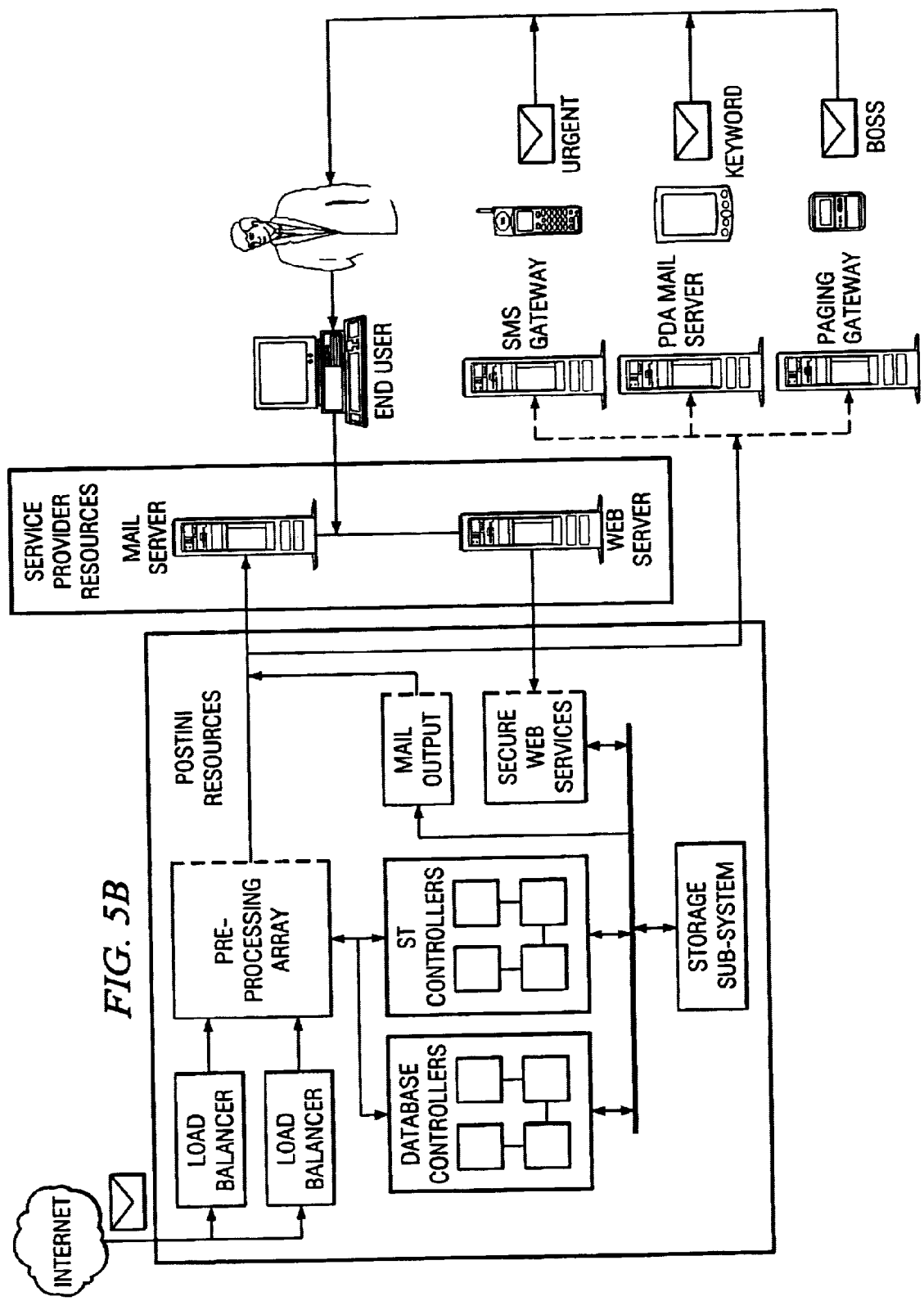
FIG. 5B is an alternate diagram of one embodiment of the server of FIG. 4.

FIG. 5B shows an alternate diagram of a system of the present invention.

Figure 6A:
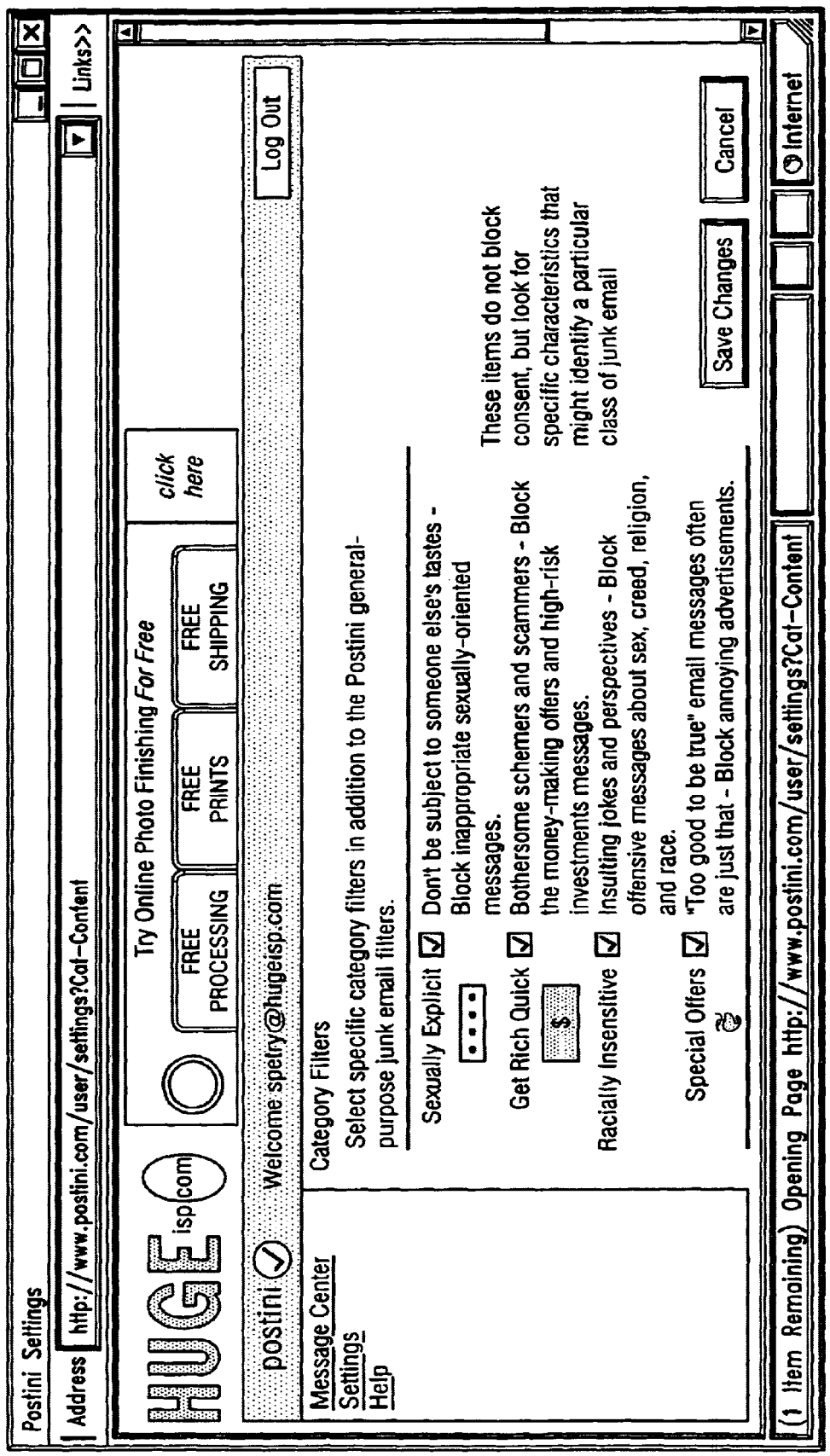
FIG. 6 is a diagram of an exemplary embodiment showing a configuration screen display that may be used to configure the unified message delivery system.
Figure 6B:
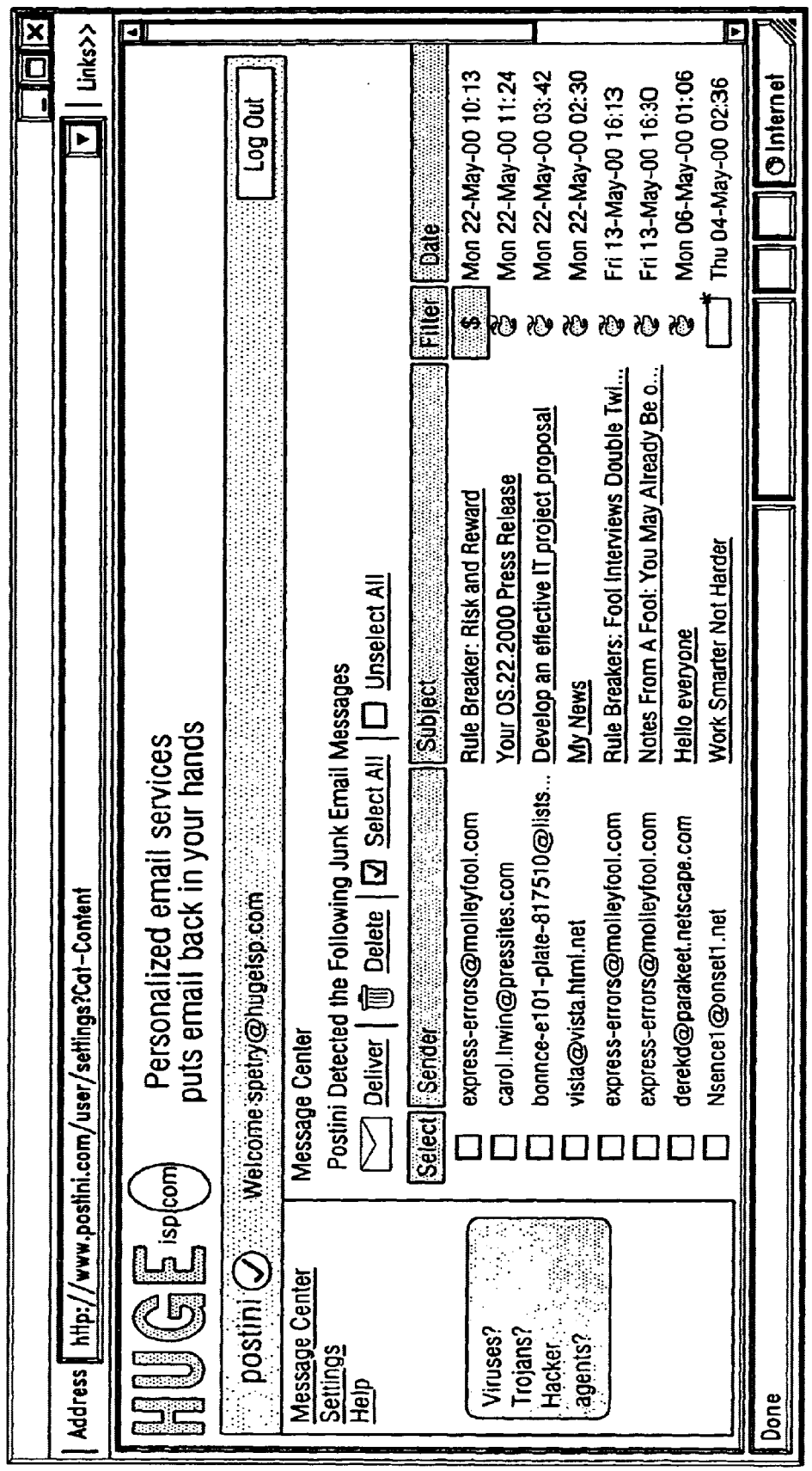

FIG. 6 shows an example of a web form screen display that may be filled out by the user to configure message delivery for that user and subsequently modified to modify the configuration. In the example shown, a subsequent screen display is shown after one of the mail filter items is selected.

In accordance with a further feature of the invention, devices may be provided with a background software routine that periodically notifies the messaging system, automatically, of the time of last user input to the device. This information may be used to dynamically route messages to increase the likelihood of early receipt by the user. For example, a user may specify messages to normally be delivered to the user's cellphone between the hours of 8–9 AM, 12–1 PM and 6–7 PM, and to the user's work between the hours of 9–12 AM and 1–6 PM, in accordance with the user's normal routine. On a particular afternoon, however, the user may be away from the office and may have used his/or her cellphone to receive or make one or more calls, or to access information, etc. If the user has selected a "find me" configuration option, then this usage information may be used to intelligently route messages to the user's cellphone, for example.

The value-added electronic messaging system detailed in the foregoing description provides an elegant solution to the multiple email box conundrum. User-centric in design, the system is end-user configurable and uses an intuitive web metaphor. Based on a scalable architecture, the system works with existing email accounts and does not require hardware or software integration.

Figure 7:
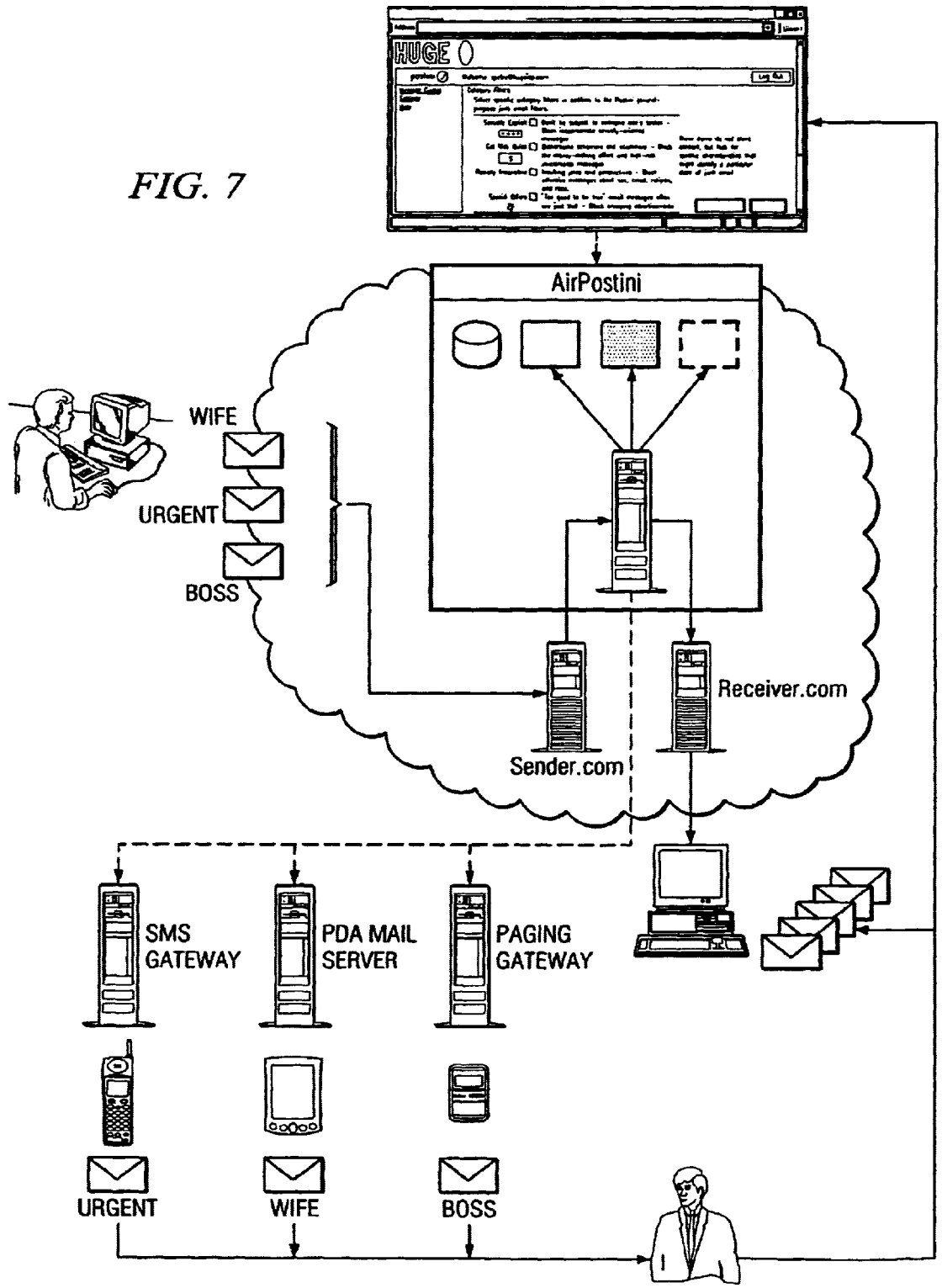
FIG. 7 is a diagram emphasizing end user configuration and mail processing.

FIG. 7 is a diagram of one embodiment of the system of the present invention emphasizing end user configuration and mail processing.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of providing electronic messaging services in an email network comprising a sending email server and a destination email server, wherein emails may be delivered from the sending email server to the destination email server via an electronic message delivery path through existing Internet infrastructure, the method comprising:
   (a) inserting an intermediate pre-processing service into the electronic message delivery path by changing a Domain Name Server entry containing an IP address of the destination email server to contain an IP address of the intermediate pre-processing service;
   (b) receiving in the intermediate pre-processing service email message data addressed to the destination email server that has been routed through the intermediate pre-processing service; and
   (c) simultaneously with receiving the email message data in the intermediate pre-processing service, processing the e-mail message data and, if the processing of the email message data instructs delivery to the destination email server, delivering the email message data to that server.

2. A method according to claim 1 wherein the processing is done on the email message data according to a stored user profile at the intermediate pre-processing service, wherein the stored user profile is associated with a user to whom an email message comprising the email message data is addressed.

3. A method according to claim 2, wherein less than all of the email message comprising the email message data is delivered to the destination email server according to the processing done at the intermediate pre-processing service.

4. A method according to claim 2, wherein the processing comprises multicasting at least a portion of the email message to destinations specified in the user profile.

5. A method according to claim 4, wherein different portions or versions of the email message are delivered to different destinations.

6. A method according to claim 5, wherein the destinations include at least one wireless device.

7. A method according to claim 2, wherein the stored user profile describes the preferences of a user who is an end user of the electronic messaging services.

8. A method according to claim 2, further comprising displaying self-enrollment information on a web page, wherein an operator or agent of the destination email server or a gateway causes the intermediate pre-processing service to be inserted into the electronic message delivery path.

9. A method according to claim 1, wherein the processing includes at least one of junk email filtering and virus detection.

10. A method according to claim 9, further comprising identifying suspect email messages and storing but not delivering the suspect email messages.

11. A method according to claim 10, further comprising a user accessing a server to inspect suspect email messages addressed to the user.

12. A method according to claim 1, wherein the processing includes delivering at least one email message comprising the email message data to one or more wireless network gateways.

13. A method according to claim 1, wherein the processing includes identifying a media part of the email message data and substituting different electronic content for the media part.

14. A method according to claim 13 wherein the different electronic content is derived from the media part.

15. A method according to claim 14, wherein the different electronic content is descriptive of the media part.

16. A method according to claim 14, further comprising, in response to a user action, delivering at least a portion of the media part.

17. A method according to claim 1, wherein the intermediate pre-processing service accepts a connection from a sending SMTP server and simultaneously with the receiving of email message data over that connection opens a connection to a receiving SMTP server.

18. A method according to claim 1, wherein the method is accomplished in the intermediate pre-processing service without providing standard mail server software in the intermediate pre-processing service.

19. An electronic message delivery system for use in an email network comprising a sending email server and a destination email server, wherein emails may be delivered from the sending email server to the destination email server via an electronic message delivery path through existing Internet infrastructure, the system comprising:
   (a) an intermediate preprocessing service configured to be inserted into the electronic message delivery path by changing a Domain Name Server entry containing an IP address of the destination email server to contain an IP address of the intermediate pre-processing service;

(b) email message data addressed to the destination email server received by the intermediate pre-processing service; and (c) a processor for processing the email message data simultaneously with the receiving of the email message data by the intermediate pre-processing service, the email message data delivered to the destination email server if the processing of the email message data instructs delivery to that server.

20. A system according to claim 19, wherein the processor is configured to process the email message data according to a stored user profile at the intermediate pre-processing service, the stored user profile associated with a user to whom an mail message comprising the email message data is addressed.

21. A system according to claim 20, wherein the processor is configured to deliver less than all of the email message comprising the email message data to the destination email server according to the processing done at the intermediate pre-processing service.

22. A system according to claim 20, wherein the processor is configured to multicast at least a portion of the email message to destinations specified in the user profile.

23. A system according to claim 22, wherein different portions or versions of the email message are delivered to different destinations.

24. A system according to claim 23, wherein the destinations include at least one wireless device.

25. A system according to claim 20, wherein the stored user profile describes the preferences of a user who is an end user of the system.

26. A system according to claim 20, further comprising a web page displaying self-enrollment information, and accessible by an operator or agent of the destination email server or a gateway to cause the intermediate pre-processing service to be inserted into the electronic message delivery path.

27. A system according to claim 19, wherein the processor is configured to filter junk email and detect viruses.

28. A system according to claim 27, wherein the processor is further configured to identify suspect email messages and store but not deliver the suspect email messages.

29. A system according to claim 28, further including a server accessible by a user to inspect suspect email messages addressed to the user.

30. A system according to claim 19, wherein the processor is further configured to deliver at least one email message comprising the email message data to one or more wireless network gateways.

31. A system according to claim 19, wherein the processor is further configured to identify a media part of the email message data and substitute different electronic content for the media part.

32. A system according to claim 31, wherein the different electronic content is derived from the media part.

33. A system according to claim 32, wherein the different electronic content is descriptive of the media part.

34. A system according to claim 32, wherein the processor is further configured to deliver at least a portion of the media part in response to a user action.

35. A system according to claim 19, wherein the intermediate pre-processing service is further configured to accept a connection from a sending SMTP server and, simultaneously with the receiving of email message data over that connection, open a connection to a receiving SMTP server.

36. A system according to claim 19, wherein the processor is configured to process the email message data without providing standard mail server software in the intermediate pre-processing service.

* * * * *

UNITED STATES PATENT AND TRADEMARK OFFICE
CERTIFICATE OF CORRECTION

PATENT NO.     : 6,650,890 B1
DATED          : November 18, 2003
INVENTOR(S)    : Irlam et al.

It is certified that error appears in the above-identified patent and that said Letters Patent is hereby corrected as shown below:

Column 2,
Line 27, please delete "Pa" and insert in lieu thereof -- PA --;
Line 52, please delete "allows" and insert in lieu thereof -- allows and --;

Column 4,
Line 17, please delete "system The" and insert in lieu thereof -- system. The --;

Column 5,
Line 1, please delete "designated" and insert in lieu thereof -- have designated --;
Line 7, please delete "look ups" and insert in lieu thereof -- looks up --;

Column 6,
Line 50, please delete "delivers This" and insert in lieu thereof -- delivers. This --;

Column 8,
Line 66, please delete "preprocessing" and insert in lieu thereof -- pre-processing --;

Column 9,
Line 17, please delete "mail" and insert in lieu thereof -- email --.

Signed and Sealed this

Twenty-fourth Day of February, 2004

JON W. DUDAS
*Director of the United States Patent and Trademark Office*